United States Patent [19]
Denniston, III

[11] 3,815,611
[45] June 11, 1974

[54] MUSCLE STIMULATION AND/OR CONTRACTION DETECTION DEVICE

[75] Inventor: Rollin H. Denniston, III, Minneapolis, Minn.

[73] Assignee: Medtronic, Inc., Minneapolis, Minn.

[22] Filed: Nov. 26, 1971

[21] Appl. No.: 202,238

Related U.S. Application Data
[63] Continuation-in-part of Ser. No. 125,300, March 17, 1971, abandoned.

[52] U.S. Cl.......... 128/419 D, 128/2 S, 128/2.05 R, 128/404, 128/419 P
[51] Int. Cl............................................. A61n 1/36
[58] Field of Search... 128/2 R, 2 S, 2.05 D, 2.05 E, 128/2.05 P, 2.05 R, 419 D, 419 P, 404, 418; 73/141 A; 338/5.41, 99, 100, 223

[56] References Cited
UNITED STATES PATENTS

| | | | |
|---|---|---|---|
| 2,976,865 | 3/1961 | Shipley | 128/2.05 D |
| 3,323,367 | 6/1967 | Searle | 338/5 |
| 3,563,245 | 2/1971 | McLean et al. | 128/419 P |
| 3,606,881 | 9/1971 | Woodson | 128/419 P |
| 3,614,955 | 10/1971 | Mirewski et al. | 128/419 D |
| 3,628,538 | 12/1971 | Vincent et al. | 128/422 |
| 3,680,544 | 8/1972 | Shinnick et al. | 128/418 |

OTHER PUBLICATIONS
Hopps et al., "Surgery" Vol. 36, No. 4, October, 1954 pp. 833–849 only p. 834 cited.

*Primary Examiner*—William E. Kamm
*Attorney, Agent, or Firm*—Lew Schwartz; Wayne Sivertson; Irving Rappaport

[57] ABSTRACT

The apparatus detects contraction of muscles of living animals, the contraction causing an elastomer body whose impedance changes when flexed, positioned adjacent muscle to flex when the contraction occurs. When a bias voltage is applied to the elastomer body, any change in impedance is readily detectable. The change in impedance may produce a rhythmically repeated elecrical signal, as, for example, when the elastomer body is used to monitor heart activity. This electrical signal can be used for triggering or controlling purposes. For example, this signal can be used to control a pulse generator so that a cardioverting or pacing pulse is generated only after a specified period of time has elapsed since the latest heart activity was sensed by the elastomer body.

12 Claims, 6 Drawing Figures

MUSCLE STIMULATION AND/OR CONTRACTION DETECTION DEVICE

CROSS-REFERENCES TO RELATED APPLICATIONS

This application is a continuation-in-part of my co-pending application, Ser. No. 125,300, filed Mar. 17, 1971, entitled MUSCLE CONTRACTION DETECTION APPARATUS now abandoned, and assigned to the assignee of the present invention.

BACKGROUND OF THE INVENTION

Monitoring of certain body parameters such as heartbeat, blood pressure in various parts of the body and breath rate has become more sophisticated in recent years. Parameters are continuously monitored in modern hospital heart care units and intensive care units by using sensing devices on and in the body with signals transmitted from those sensing devices to central stations. Much of the equipment will sound alarms if a malfunction of a monitor of vital function is indicated so that prompt remedial action can be taken.

Surgical procedures have developed along with improved sensing apparatus enabling the monitoring of parameters that were impossible of monitoring in the past. Sensing devices such as catheters containing perssure transducers have been introduced into the heart to detect malfunctions such as fibrillation, or the heart in arrest, tachycardia or bradycardia. The sensor output can be used to trigger a device such as an Electronic Standby Defibrillator as taught by Mieczyslaw Mirowski, et al in U.S. Patent application Ser. No. 9,934 now U.S. Pat. No. 3,614,954, filed 9 Feb. 1970, for automatic defibrillation of the heart when fibrillation is indicated. Also, such catheters can be used to trigger a demand heart pacer when a heartbeat is required, or a cardioverter when a shock is required to correct an arrhythmic heart condition.

In the prior art, sensing has been commonly done through pressure sensing and electrical activity sensing. Pressure sensing lends itself very well to fluid pressure sensing and is therefore commonly used in heartbeat detection by measuring pressure within the heart itself or measuring the pressure in the great vessels. Electrical activity sensing lends itself to many uses such as electrocardiogram, both external and internal.

Electrical activity detection has, as a main disadvantage, great susceptibility to outside interference. The electrical current levels are so minute that measurement is easily disrupted by any external electrical field.

The pressure detection sensor is much less susceptible to interference. One disadvangage is that in its ordinary use within the blood stream, either in the heart or in the great vessels, it is susceptible to a buildup of fibrotic tissue. Such a buildup tends to dampen the pressure transducer mechanism. Ordinarily a diaphragm is mechanically moved by the blood pressure resulting, ultimately, in an electrical signal. After 2 or 3 weeks however, the buildup is such that the signal output becomes too small to be useful.

Another disadvantage of the pressure detection sensor is that it requires a relatively high amount of biasing current to operate the transducer. An ordinary range might be from 500 microamperes to 1 milliampere. When such a transducer is introduced into a chamber of the heart, there is danger of shock damage to the patient.

The muscle contraction detection apparatus overcomes these prior art disadvantages. The sensor is not sensitive to any outside electrical or magnetic fields. It also requires a very low biasing current — in the order of 6 microamperes. This very low level current is not at all dangerous to the patient. Also, when the sensor is used in the blood stream, it has been found that a buildup of fibrotic tissue does not impede the flexing at all since the fibrotic tissue itself is readily flexed. Therefore, the very long-term use of a muscle contraction detection catheter, for example, could be expected.

The muscle contraction detection apparatus of this invention is not limited to introduction into the heart or the great vessels. It may be used internally on many of the body's organs such as the entire digestive tract to monitor muscle activity.

In the prior art, flexible conductors were used for entirely different purposes. Carbon-loaded vinyl material (a flexible conductor) has been used in radio frequency shielding applications. For example, it has been used for sealing in wave guide junctions. However, in such applications, the changing impedance by deforming the material results in noise, and is not desirable. This invention makes use of the changing impedance with deformation characteristic.

Efforts have been made to design fluid flow measuring pressure transducers utilizing this material. It is placed between two electrodes and squeezed by one of the electrodes being moved by the fluid pressure. This use is set out in *The Review of Scientific Instruments*, Vol. 41, No. 5 dated May, 1970, in an article entitled "Conductive Rubber Pressure Transducers for Fluids Research."

This material has also been used in "stretch" transducers. A Stretch transducer coupled with a pulsed transmitting, receiving and decoding system is described in an article entitled "A Simple Transducer and Telemetry System for Motility and Distention Studies" in *Proceedings, Second Annual Rocky Mountain Bioengineering Symposium*, May 3–4, 1965.

The utilization of flexible conductors to sense muscular activity within the body of a living animal takes advantage of the changing impedance with deformation characteristic of the flexible conductor to provide a reliable, long life muscle contraction detector. BRIEF SUMMARY OF THE INVENTION Briefly described, this invention is a means for detecting body muscle activity. The apparatus of this invention is capable of sensing muscular activity within a living body. For example, it can be used to sense heart activity.

Specifically, this invention deals with the novel use of an elastomer body which in the inventive embodiments disclosed herein is in a flexible conductor form and is referred to as a flexible conductor. The flexible conductor, of this invention, is formed by loading an elastomer such as vinyl with fine particles of carbon black. Its conductivity (impedance) is thus, a function of the density of the carbon particles. If the flexible conductor is deformed by bending, the orientation of the carbon particles will be changed, thus changing the conductivity. This change in conductivity is easily detected. For example, if a constant potential is applied across the flexible conductor, the change in current through it is representative of its change in conductivity.

A novel use of the flexible conductor is the detection of muscle contractions in a living animal. More specifically, when the flexible conductor of the detection apparatus is positioned adjacent a muscle of a living animal, every contraction of that muscle will flex the flexible conductor, thus changing its conductivity (impedance). This change in impedance can be used to produce an electrical signal whenever the flexible conductor is flexed.

This electrical signal can be used for monitoring or for triggering and controlling purposes. For example, this signal can be used to control a pulse generator — commonly in the form of a cardioverter or in the form of a cardiac pacer — so that a cardioverting or pacing pulse is generated only when a specified period of time has elapsed since the latest heart activity was sensed by the flexible conductor. "Cardioverting" or "cardioversion" as used herein is intended to mean a method of correcting a number of arrhythmic heart conditions, both lethal and non-lethal. Those arrhythmic heart conditions include atrial tachycardia, atrial flutter, atrial fibrillation, junctional rhythms, ventricular tachycardia, ventricular flutter, and ventricular fibrillation, and any other non-pacing related arrhythmic condition which may be corrected by applying electrical shocks to the heart. Obviously then, "defibrillation" is included in the term cardioversion as a method of applying electrical shocks to the heart to defibrillate a fibrillating atrium or a fibrillating ventricle.

The flexible conductor is especially well suited to sensing muscle contractions as it responds well to rhythmic flexing action, as for example, in heart activity. Thus, any deviation in the rhythm or amplitude of heart contractions is detectable. Also, the ability of the flexible conductor to operate on a very small bias current, in the range of 6 microamps, is a tremendous asset as it allows the muscle contraction detection apparatus to be safely inserted into a living animal. The small size of the flexible conductor further permits it to be used in a body implantable catheter type electrical lead.

These and other aspects of the invention, as well as many of the attendant advantages thereof, will become more readily apparent when reference is made to the following description taken in conjunction with the accompanying drawings.

BRIEF DESCRIPTION OF THE DRAWINGS

For clarity, the corresponding elements in the various figures show the same tens and units digits. Only the hundreds digits differ.

DETAILED DESCRIPTION OF THE INVENTION

Figure 1:
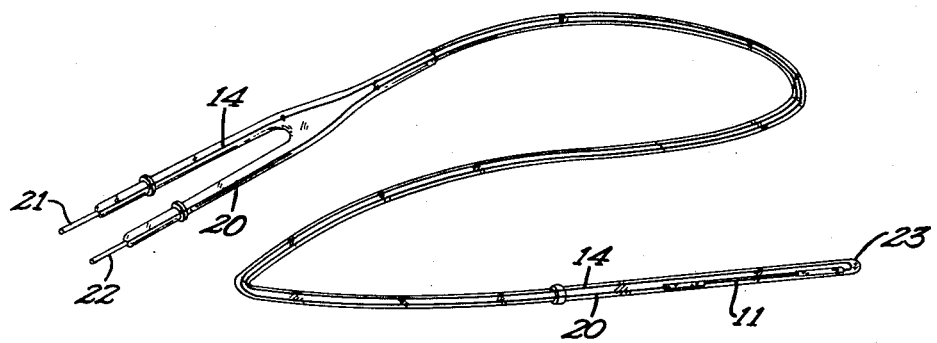
FIG. 1 illustrates an embodiment of the invention as a muscle contraction detecting lead.

The apparatus of this invention, as shown in FIG. 1, is used to detect muscle contraction in living animals. The invention was primarily designed to be used in a body implantable electrical lead embodiment, in which the lead is inserted into the heart of a living animal and used to sense heart activity. However, it will be understood that this invention is not limited to sensing heart activity, but can be used to sense other types of muscular activity.

In FIG. 1, an electrical lead is shown having a flexible enclosure 23 which is adapted for insertion into a living body by being sealed so that it is impervious to living body fluids and tissue, thereby permitting it to be positioned adjacent muscle inside a living body. Enclosure 23 may, for example, be made of a silicone rubber which is substantially inert to body fluids and tissue. Within this enclosure 23 is shown flexible electrical conductor 11 to which is attached electrical conductors 14 and 20, terminating in connector pins 21 and 22, respectively. Flexible conductor 22 is manufactured by loading an elastomer, such as vinyl, with fine particles of carbon black. The resulting electrical conductivity of flexible conductor 11 is thus, a function of the density of the carbon particles.

Figure 2:
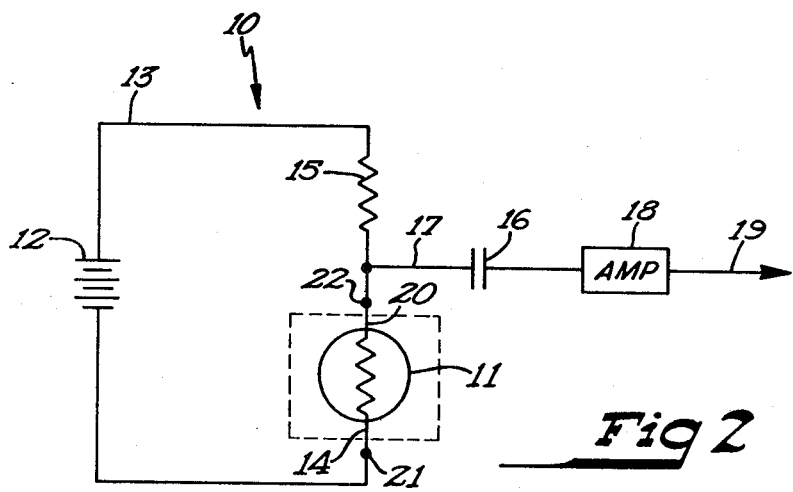
FIG. 2 shows an electrical circuit which may be used with the muscle contraction detecting lead of FIG. 1.

FIG. 2 illustrates the placement of the flexible conductor 11 within a circuit 10 suitable for detection of any flexing of flexible conductor 11. It will be understood that circuit 10 is just one example of the numerous circuits suitable for detecting flexing of flexible conductor 11. In the circuit shown in FIG. 2, a voltage source 12 is connected at one side to a fixed resistor 15 by conductor 13. The other side of voltage source 12 is connected to one end of flexible conductor 11 through connector pin 21 and conductor 14. The other end of flexible conductor 11 is connected to the other side of fixed resistance 15 through conductor 20 and connector pin 22. Conductor 17 is connected at the junction between fixed resistance 15 and flexible conductor 11. A capacitor 16 AC couples conductor 17 to amplifier 18. Capacitor 16 is used to prevent the operational bias of amplifier 18 from shifting as a result of resistance changes with the passage of time. Of course, it is a simple matter to eliminate capacitor 16 and DC couple to amplifier 18, dictated by the selection of amplifier 18 from a wide variety of amplifiers available in the prior art. For example, amplifier 18 may be an operational amplifier in this application.

Figure 3:
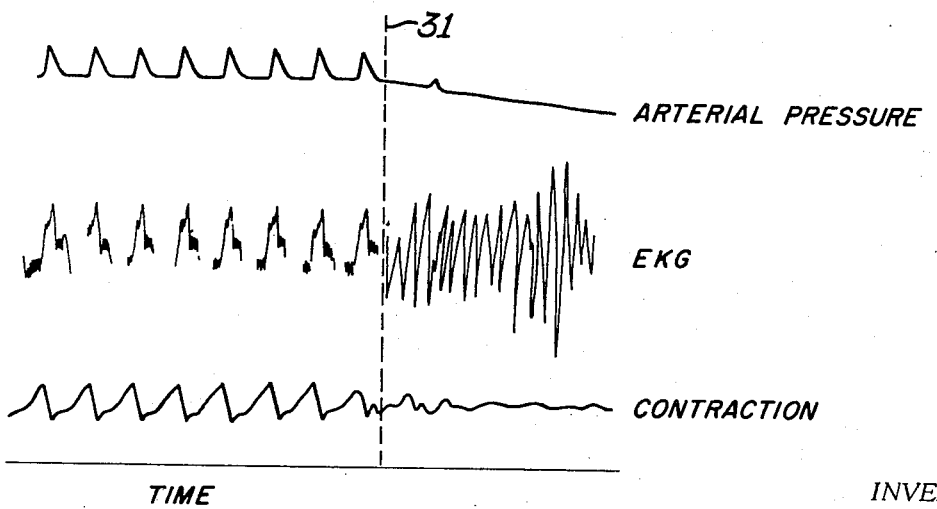
FIG. 3 is a chart of the heart activity of a living body through the use of electrical, pressure and muscle contraction sensing.

FIG. 3 is a graph showing at the top the trace of arterial pressure of a living body as sensed by a pressure detector sensor. The center trace is the trace of an ordinary electrocardiograph (EKG). The bottom trace is produced by the muscle contraction detection apparatus of this invention when used in a body implantable electrical lead embodiment introduced into the right ventricle of the heart.

With reference to FIG. 3, all three traces illustrate normal heartbeat up to dotted line 31, at which time fibrillation is introduced. It can be seen that the arterial pressure drops off, that there is a great disturbance in the EKG trace and that the muscle contraction sensor trace illustrates lack of heart motion to the extent that heart contraction is no longer occurring.

Figure 4:
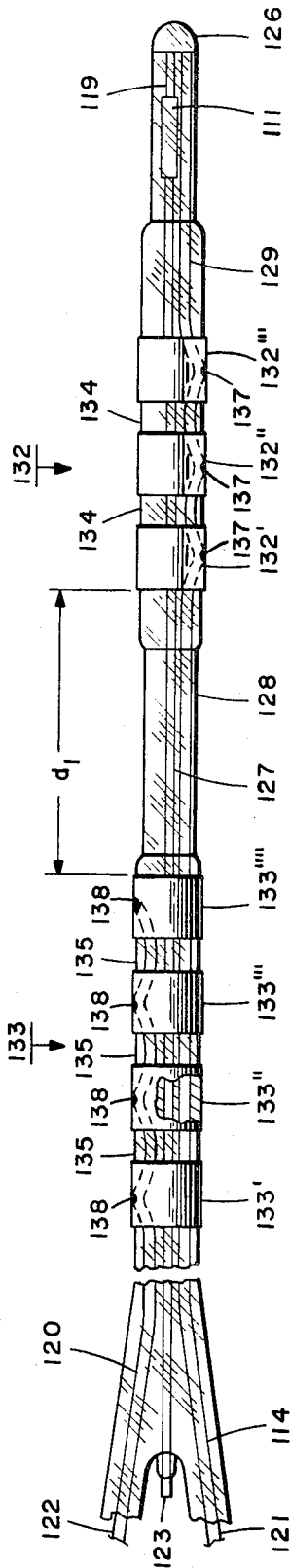
FIG. 4 illustrates an embodiment of the invention in the form of a muscle contraction stimulating and detecting lead.

A muscle contraction stimulator and detector is shown in the FIG. 4 embodiment as a body implantable lead 110 comprising a flexible, electrical conductor 111, a distal electrode shown generally at 132, and a proximal electrode indicated generally at 133. An electrical connection is made via the series combination of coil spring wire 127, flexible conductor 111, and conductor 119, which are completely molded in a silicone rubber casting 128 to protect them from the corrosive environment inside the human vascular system by sealing them from body fluids, to terminal 126 affixed to the extreme distal end of lead 110. Coil spring wire 127 is constructed so that a stylette may be passed therethrough to facilitate introduction and placement of lead 110 in proper position within the human body. Conductor 119 electrically connects flexible connector 111 between coil 127 and terminal 126. Terminal 126 is further electrically connected to distal electrode 132 by means of a conductor 129.

Distal electrode 132 comprises a plurality of spaced-apart conductive metal rings 132', 132'', 132''' which in the embodiment shown number three. The three metal rings comprising distal electrode 132 may, for example be made of solid platinum-iridium. Each ring fits snugly against axial movement around enclosure 128. A spacing 134 is left between each ring in order to provide the electrode 132 with the necessary flexibility for being positioned in the vascular system without undue stress and strain. The plurality of rings 132', 132'' and 132''' is provided for electrode 132 to provide additional surface contact with the heart tissues when implanted so as to yield good electrical contact. Each of the rings 132', 132'', and 132''' of the electrode 132 are electrically connected together in series by conductor 114 which terminates in connector pin 121. Rings 132', 132'', 132''' of electrode 132 are electrically connected to conductor 113 at junctions 137. Conductor 114 is a low impedance wire, for example, platinum tinsel wire or three serve copper tinsel wire of the type described in U.S. Pat. No. 3,572,344. The wire should be sufficiently conductive to adequately conduct the voltage levels used in cardioverting and particularly those levels used in defibrillating.

Proximal electrode 133 is similar to distal electrode 132 except that electrode 133 has one more spaced-apart conductive ring. Each of the rings 133', 133'', 133''', and 133'''' of electrode 133 are electrically connected together in series by low impedance conductor 120 which terminates in connector pin 122 and are spaced apart by spacings 135. Rings 133', 133'', 133''', and 133'''' of electrode 133 are electrically connected to connector 120 at junctions 138. Conductor 120 is typically of the same construction and configuration as that of conductor 114.

Although the embodiment shown in FIG. 4 depicts the distal electrode 132 as having three conductive rings and proximal electrode 133 as having four conductive rings, the number of rings for each electrode may be varied. Also, the length of each of the rings, as well as the spacing between them, 134 and 135 may vary. The important relationship is that lead 110 be sufficiently flexible to be easily positioned within the vascular system and at the same time that there be sufficient surface area on each of the electrodes to provide good electrical contact with the heart when lead 110 is properly positioned to conduct voltages sufficient to cardiovert or defibrillate the heart. In the specific embodiment shown in FIG. 4, the rings of electrode 133 and electrode 132 are larger than the spacings between them, 134 and 135. An alternative operative embodiment to the specific embodiment of FIG. 4 may have the rings of electrode 133 and electrode 132 at one-fourth inch in length with the spacings between them, 134 and 135, each three-eighths inch. The overall length of the body implantable lead 110 may typically be approximately 60-70 cm. Another dimension of importance is the intraelectrode distance $d_1$, shown in FIG. 4, between the most distal electrode ring 133'''' of electrode 133 and the most proximal electrode ring 132' of electrode 132. Of course, the required distance will be slightly different from one patient to the next. However, a good average is between 10 and 12 cm. for the intraelectrode distance $d_1$.

Figure 6:
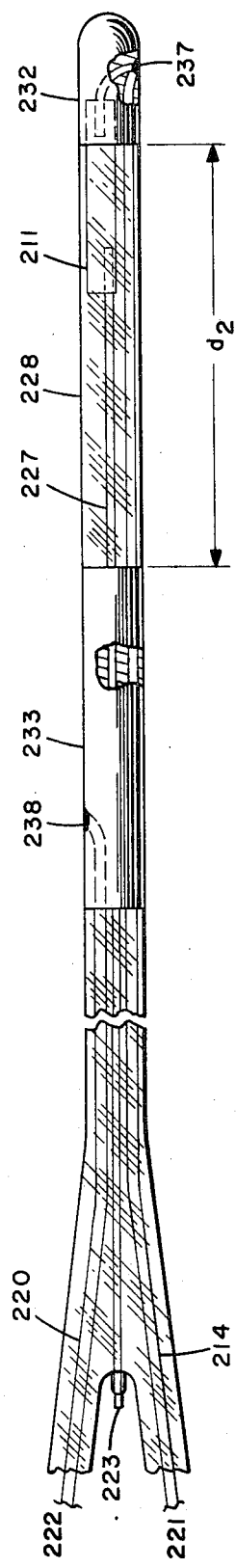
FIG. 6 is an alternative embodiment of the invention as a muscle contraction stimulating and detecting lead.

FIG. 6 shows an alternative embodiment of a body implantable lead 210, in which highly conductive silicone rubber electrodes are used and flexible conductor 211 is directly connected to distal electrode 232. The conductive silicone rubber electrodes can be made by loading the silicone rubber with fine particles of carbon black. In all other respects, the embodiment shown in FIG. 6 is similar to that shown in FIG. 4.

Body implantable lead 210 comprises a flexible electrical conductor 211, a distal electrode 232, a proximal electrode 233 and a silicone rubber casing 228. Flexible conductor 211 is electrically connected to the proximal end to a coil spring wire 227 which is completely moulded in rubber casing 228, and at the distal end to distal electrode 232 via junction 237. Coil spring wire 227 terminates in connector pin 223 and is constructed so that a stylette may be passed therethrough to facilitate lead placement in the proper position within the human body. Casing 228 which is substantially inert in living body fluids and tissue protects lead 210 from the corrosive environment inside the human vascular system.

Distal electrode 232 is constructed of a silicone rubber material which is sufficiently flexible so that it can be easily positioned within the vascular system of a living animal. Electrode 232 is electrically connected to conductor 214 which terminates in connector pin 221. Connector 214 is a low impedance wire, for example platinum tinsel wire or three served copper tinsel wire of the type described in U.S. Pat. No. 3,572,344. The wire should be sufficiently conductive to adequately conduct the voltage levels used in cardioverting and particularly those levels used in defibrillating.

Proximal electrode 233 is also constructed of a flexible silicone rubber material. Electrode 233 is electrically connected at junction 238 to conductor 220 which terminates in connector pin 222. Conductor 220 is typically of the same construction and configuration as that of conductor 214.

In the specific embodiment shown in FIG. 6, proximal electrode 233 is 5 inches in length and distal electrode 232 is 2 inches in length. The length of the electrodes 233 and 232 can of course be varied. The important relationship is that there be sufficient surface area on each of the electrodes to provide good electrical contact with the heart when lead 210 is properly positioned in the vascular system. The overall length of the body implantable lead 210 is typically approximately 60-70 cm. while the intraelectrode distance $d_2$ is typically 10-12 cm.

Figure 5:
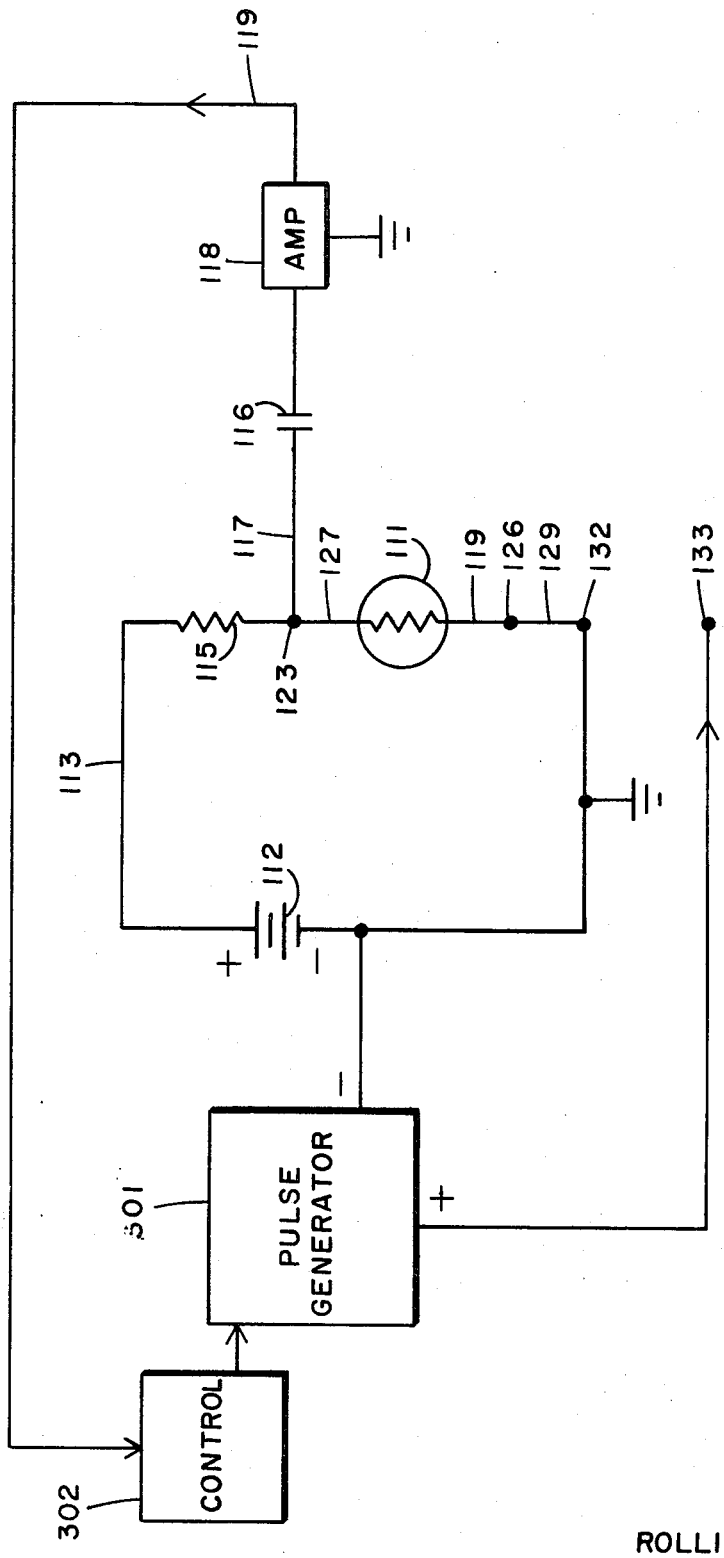
FIG. 5 is a schematic diagram of an electrical circuit which may be used with the muscle contraction stimulating and detecting lead of FIG. 4.

FIG. 5 illustrates the placement of the body implantable lead 110 of FIG. 4 within a circuit 300 suitable for cardioverting and/or pacing a malfunctioning heart. As should be readily apparent, the circuit shown in FIG. 2 is included substantially unchanged in the circuit of FIG. 5. Common elements contain the same tens and units digits in both FIG. 2 and FIG. 5. Specifically, voltage source 112 is connected to one side of fixed resistor 115 by conductor 113; conductor 117 is connected at the junction between flexible conductor 111 and the other side of resistor 115 for convenience denoted junction 123; capacitor 116 is used to AC couple conductor 117 to the input side of amplifier 118; and output line 119 is connected to the output side of amplifier 118. The signal at output line 119 is electrically connected to a pulse generator 301 through a control means 302. Pulse generator 301 is electrically connected to proximal electrode 133 and distal electrode 132 and is capable of producing a cardiverting and/or pacing pulse between them. Since distal electrode 132 is connected to terminal 126 via conductor 129 and flexible conductor 111 is also connected to terminal 126 via conductor 119, distal electrode 132 is connected to flexible conductor 111.

The circuit of FIG. 5 can be easily modified to show the alternative embodiment of the implantable lead 210 of FIG. 6. This is accomplished by eliminating terminal 126 and conductors 119 and 129, and directly connecting flexible conductor 211 to distal electrode 232 as seen in FIG. 6.

MODE OF OPERATION

The muscle contraction detection apparatus of FIG. 1, in the form of an electrical lead, is adapted so that it can be positioned adjacent muscle of a living animal. When it is so positioned, it is capable of detecting contractions of the muscle. The detection of these muscle contractions is accomplished by attaching conductors to connectors pins 21 and 22 of the FIG. 1 apparatus and connecting them in a circuit as shown in FIG. 2.

FIG. 2 shows voltage source 12 impressed across fixed resistance 15 and flexible conductor 11. When the muscle contracts, flexible enclosure 23 bends, flexing flexible conductor 11. This flexing results in changing the orientation of the carbon particles contained within flexible conductor 11, thus changing its impedance. This change in impedance can be easily detected. The changing impedance causes the current through conductor 11 and resistor 15 to change. This changing current is sensed by capacitor 16 and coupled through capacitor 16 to amplifier 18 where it is amplified, shaped and transmitted on conductor 19. This electrical output signal, in the form of a pulse, can be used for whatever electronic purpose desired. For example, it can be used to control a pulse generator in a cardioverting or pacing system.

Through known surgical procedures, the muscle contraction stimulation and detection apparatus of FIG. 4, in the form of an electrical lead 110, is inserted into the heart, commonly into a right ventrical thereof. Lead 110 is introduced through a peripheral vein, such as, for example, the right jugular vein, by means of surgery very similar to that involved in the implantation of a pacemaking catheter. Lead 110 is designed so that the distal electrode 132 is located in the right ventricle with terminal 126 lodged firmly in the apex of the right ventricle and proximal electrode 133 is located immediately superior to the right atrium, or just outside the cardiac silhouette in the caval system (not shown). When positioned in this manner, flexible conductor 111 is lodged in the right ventrical against the heart's ventricular septum which lies between the right and left ventricles so that it will be flexed and thus, sensed contractions of the heart.

Electrical lead 110 can be used in heart cardioverting and also in heart pacing. When used in the pacing mode, the pacing pulse applied to the heart must, of course, be of a much smaller energy content than that of the typical cardioverting pulse, but otherwise the operation is quite similar. The pacing pulse, like the cardioverting pulse, is applied to the heart between distal electrode 132 and proximal electrode 133. Thus, when lead 110 is lodged in the heart as described above, an electrical impulse between the electrodes of lead 110 can be used to cardiovert or to pace the heart, depending upon the energy content of the impulse.

When used in the defibrillating-pacing embodiment, as shown in FIG. 5, a biasing voltage from source 112 is impressed across fixed resistance 115 and flexible conductor 111. A heartbeat will flex conductor 111, changing the carbon particle orientation in it and thus, its impedance. This change in impedance is easily detectable. The changing impedance causes the current through conductor 111 as well as the voltage across conductor 111 to change. Capacitor 116 and amplifier 118 are connected to flexible conductor 111 such that they are able to sense a change in an electrical parameter of conductor 111 and generate an output signal in response thereto. The electrical output signal can be transmitted on conductor 119 for use in suppressing the generation of a cardioverting and/or pacing pulse from pulse generator 301. Thus, flexible conductor 111 can be employed to control a pulse generator 301 so that a cardioverting and/or pacing pulse is generated only when a specified period of time has elapsed since the last heart activity sensed by flexible conductor 111.

Since the mode of operation of the FIG. 6 lead embodiment is identical with that of the FIG. 4 lead embodiment, the above description of the operation of lead 110 of FIG. 4 is equally applicable to lead 210 of FIG. 6 when used in the circuit shown in FIG. 5.

The use of this invention is by no means limited to the particular embodiment shown. All external movements can be monitored as well as all internal movements of the living body. This skilled in the art are aware of many applications and thus, the preferred embodiments shown herein are not intended to limit these applications. For example, by appropriate modification of lead 110 — adding an additional electrical conductor — it is possible to isolate the cardioverting circuit from the sensing circuit. In this example, isolation results since the sensing element, flexible conductor 111, is not electrically connected to the cardioverting electrodes 132 or 133, but rather is electrically connected to and biased through coil 127 and the added conductor. Also, in this example, if terminal 126 is modified so that it is in the form of a conductive cap, it is possible to pace the heart between electrodes positioned within the heart. This is accomplished by using modified terminal 126 as one electrode and electrode 132 as the other. Thus it is to be understood that numerous modifications may be made in the illustrated embodiments of the invention, and other arrangements may be devised without departing from the spirit and scope of the invention.

What is claimed is:

1. Body implantable transducer apparatus adapted for connection to a source of electrical power for directly transforming a muscle contraction into a measurable electrical parameter comprising:
   a. elongated, omnidirectionally flexible, enclosure means substantially inert in living body fluids and tissues, the enclosure means having a predetermined length and a distal end, and being adapted to substantially follow the path defined by a vessel of a living animal into which it is inserted and to be positioned with at least its distal end adjacent a muscle of the living animal so that a contraction of the muscle causes at least the distal end of the enclosure means to flex therewith, the enclosure means further being adapted for enclosing at least some of the following elements, thereby sealing them from living body fluids and tissues;
   b. elastomer body means having conductive particles imbedded therein for exhibiting a change in electrical impedance upon flexing, the body means being enclosed by and generally longitudinally positioned within the enclosure means adjacent its distal end for flexure therewith;
   c. terminal means attached to and extending to a point external to the enclosure means for connection to a source of electrical power; and
   d. connective means electrically connected to the terminal means and enclosed by and positioned along the length of the enclosure means, the connective means being electrically connected to the body means for registering a change in impedance of the body means caused by its flexure may be registered at the terminal means.

2. The apparatus of claim 1 wherein the body means provides omnidirectional sensitivity.

3. Body implantable transducer and impulse conducting apparatus adapted for connection to a source of electrical power including impulse generating means for directly transforming a muscle contraction into a measurable electrical parameter and for electrically stimulating a muscle to effect muscular action, comprising:
   a. elongated, omnidirectionally flexible, enclosure means substantially inert in living body fluids and tissues, the enclosure means having a predetermined length and a distal end, and being adapted to substantially follow the path defined by a vessel of a living animal into which it is inserted and to be positioned with at least its distal end adjacent a muscle of the living animal so that a contraction of the muscle causes at least the distal end of the enclosure means to flex therewith, the enclosure means further being adapted for enclosing at least some of the following elements, thereby sealing them from living body fluids and tissues;
   b. elastomer body means having conductive particles impedded therein for exhibiting a change in electrical impedance upon omnidirectional flexing, the body means being enclosed by and generally longitudinally positioned within the enclosure means adjacent its distal end for flexure therewith;
   c. terminal means extending to a point external to the enclosure means for connection to a source of electrical power including impulse generating means;
   d. connective means electrically connected to the terminal means and enclosed by and positioned along the length of the enclosure means, the connective means being electrically connected to the body means for registering a change in impedance of the body means caused by its flexure at the terminal means; and
   e. electrode means for applying an electrical impulse to a muscle to effect muscular action, the electrode means being positioned along the length of the enclosure means adjacent the muscle and being electrically connected to the connective means.

4. The apparatus of claim 3 wherein:
   a. the electrode means further comprises a first electrode positioned adjacent the distal end of the enclosure means;
   b. the terminal means further comprises first and second conductive terminals; and
   c. the connective means further comprises a first electrical conductor attaching the first electrode and the body means to the first and second terminals.

5. The apparatus of claim 3 wherein the vessel of the living animal comprises the heart, and:
   a. the electrode means comprises at least two electrodes spaced from one another to be inside and outside the heart, respectively, the apparatus being adapted for use in cardioverting and/or pacing a malfunctioning heart; and
   b. the connective means comprising first and second conductors attaching the electrodes to the terminal means.

6. The apparatus of claim 5 wherein each electrode includes at least two metallic conductive surfaces spaced from one another.

7. The apparatus of claim 5 wherein each electrode is constructed of a flexible conductive non-metallic material.

8. The apparatus of claim 7 wherein the non-metallic material is a silicone rubber material loaded with conductive particles.

9. The apparatus of claim 5 wherein the first electrical conductor attaches the first electrode and the body means in electrical series relation with the first and second terminals.

10. Muscle contraction stimulation and detection apparatus comprising:
    a. body implantable transducer and impulse conducting means for directly transforming a muscle contraction into a measurable electrical parameter and for electrically stimulating a muscle further comprising:
       1. elongated, omnidirectionally flexible, enclosure means substantially inert in living body fluids and tissues, the enclosure means having a predetermined length and a distal end, and being adapted to substantially follow the path defined by a vessel of a living animal into which it is inserted and to be positioned with at least its distal end adjacent a muscle of the living animal so that a contraction of the muscle causes at least the distal end of the enclosure means to flex therewith, the enclosure means further being adapted for enclosing at least some of the following elements, thereby sealing them from living body fluids and tissues;
       2. elastomer body means having conductive particles imbedded therein or exhibiting a change in electrical impedance upon omnidirectional flexing, the body means being enclosed by and generally longitudinally positioned within the enclosure means adjacent its distal end for flexure therewith;

3. terminal means extending to a point external to the enclosure means for connection to a source of electrical power including impulse generating means;

4. connective means electrically connected to the terminal means and enclosed by and positioned along the length of the enclosure means, the connective means being electrically connected to the body means for registering a change in impedance of the body means caused by flexure at the terminal means; and 5. electrode means for applying an electrical impulse to a muscle to effect muscular action, the electrode means being positioned along the length of the enclosure means adjacent the muscle and being electrically connected to the connective means;

b. detecting means for providing a usable electrical signal as a result of the change in electrical impedance of the body means when it is flexed by a muscle contraction including a source of electrical potential externally connected to the terminal means for passing a constant electrical current through the body means, and an electrical signal amplifier externally connected to the terminal means for detecting a change in the electrical current covered by a change in electrical impedance of the body means registered at the terminal means and providing the usable electrical signal; and c. muscle stimulating means for selectively generating an electrical impulse of predetermined amplitude and duration, and for externally applying the electrical impulse to the terminal means so that the electrical impulse may be conducted by the electrode means to the muscle.

11. The system of claim 10 wherein the impulse generating means is a cardiac pacer and the flexible enclosure means is an intravenous catheter adapted for insertion into the heart of the living animal.

12. The system of claim 10 wherein the flexible enclosure means is an intravenous catheter adapted for insertion into the heart of the living animal, and the impulse generating means is adapted to provide impulses having sufficient energy for defibrillating the heart.

* * * * *